(12) United States Patent
Sawano et al.

(10) Patent No.: US 6,404,510 B1
(45) Date of Patent: *Jun. 11, 2002

(54) IMAGE PRINTING METHOD

(75) Inventors: Mitsuru Sawano; Osamu Shimizu, both of Shizuoka (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,459

(22) Filed: May 28, 1998

(30) Foreign Application Priority Data

May 28, 1997 (JP) ............................................. 9-138669

(51) Int. Cl.$^7$ ................................................ H04N 1/405
(52) U.S. Cl. ........................ 358/1.9; 358/1.2; 358/3.12; 358/533; 358/298
(58) Field of Search ...................... 358/1.2, 1.9, 515, 358/518, 459, 454, 457, 521, 533, 534, 535, 536, 298; 382/162, 167; 347/251, 254

(56) References Cited

U.S. PATENT DOCUMENTS

| | | | | |
|---|---|---|---|---|
| 4,958,218 A | * | 9/1990 | Katayama et al. | 358/530 |
| 5,297,878 A | * | 3/1994 | Saito et al. | 400/120.02 |
| 5,394,252 A | * | 2/1995 | Holladay et al. | 358/533 |
| 5,469,266 A | * | 11/1995 | Usami et al. | 358/298 |
| 5,494,361 A | * | 2/1996 | Sonoda | 400/120.07 |
| 5,548,407 A | * | 8/1996 | von Kienlin | 358/298 |
| 5,841,955 A | * | 11/1998 | Wang | 358/1.9 |
| 5,883,725 A | * | 3/1999 | Sawano | 358/298 |

* cited by examiner

*Primary Examiner*—Thomas D. Lee
(74) *Attorney, Agent, or Firm*—Sughrue Mion, PLLC

(57) ABSTRACT

An image printing method, wherein one pixel is formed from a plurality of dots arranged in a primary scanning direction, in which printing elements are arranged, and in a secondary scanning direction perpendicular to the primary scanning direction; wherein the tone of one pixel is expressed by changing the overall printing area in accordance with whether or not the dots are printed; and wherein a multicolor image is printed by combination of one yellow pixel, one magenta pixel, one cyan pixel, and one black pixel, the method comprising the step of: setting to a nonintegral multiple a dimensional ratio among one yellow pixel, one magenta pixel, one cyan pixel, and one black pixel in the secondary scanning direction.

16 Claims, 2 Drawing Sheets

| K | C | M | Y |
|---|---|---|---|
| 600dpi | 500dpi | 600dpi | 600dpi |
| 300dpi | 250dpi | 200dpi | 150dpi |

IMAGE PRINTING METHOD

BACKGROUND OF INVENTION

The present invention relates to a gray-scale image printing method used for a thermal printer which uses a thermal head having a plurality of printing elements (or heating elements) arranged thereon, and more particularly, to an image printing method which utilizes a dither pattern.

There has been proposed an image printing method that involves producing a gray-scale image by changing a period of time during which power is applied to heating elements of a thermal printer so as to change the area of printing dots, each of which is printed on printing paper as a single dot.

Under this method, an image is printed on printing paper while a thermal head is actuated in a secondary scanning direction (i.e., in a direction perpendicular to the direction in which the heating elements are arranged) for each color component. Accordingly, color pixels may sometimes deviate from one another in the secondary scanning direction. In the event of the pixels' deviating from one another (hereinafter referred to as "misregistration"), moire (interference fringes) appears, resulting in a change in color tone and an image differing in color from the original image.

As a technique of eliminating a change in color tone stemming from such moire or misregistration, there is described an image printing method in Hei. 7-312677.

This image printing method (i.e., a VR screen method) involves forming a color dot pattern for each color, which has desired resolution in the secondary scanning direction, by changing dot pitch in the same direction at a desired magnification and by superimposing the thus-prepared different color dot patterns one over another so as to create an image in multiple colors. Consequently, chromatic misregistration is prevented from arising in one particular direction, thus preventing chromatic moire.

In the existing heat-transfer thermal printer, ink applied over an ink ribbon is heated by heating elements, and the thus-heated ink is transferred to printing paper. Such a configuration makes it difficult to change the tone of a pixel comprising one dot. To solve the problem, there has been proposed a method using a dither pattern which enables a heat-transfer system to produce a gradient expression.

Under this method, an M×N array of dots is handled as one block or one unit matrix, and the combination of the number of dots to be transferred within one block and the dot size is controlled so as to enable a gradient expression.

In a case where the VR screen method used for the purpose of preventing chromatic misregistration and the dither pattern enabling a gradient expression are used in combination, an actual dot pitch is determined without reference to resolution by means of the dither pattern, posing a problem of the VR screen method, which prevents chromatic misregistration by changing the dot pitch for each color, having difficulty in sufficiently preventing chromatic misregistration.

SUMMARY OF INVENTION

The present invention has been conceived in light of the foregoing problems, and the object of the present invention is to provide an image printing method capable of preventing chromatic misregistration even when dither patterns are utilized.

The present invention provides an image printing method, wherein one pixel is formed from a plurality of dots arranged in the primary scanning direction, in which printing elements are arranged, and in the secondary scanning direction perpendicular to the primary scanning direction; wherein the tone of one pixel is expressed by changing the overall printing area in accordance with whether or not the dots are printed; and wherein a multicolor image is printed by combination of one yellow pixel, one magenta pixel, one cyan pixel, and one black pixel, the method comprising the step of: setting to a nonintegral multiple a dimensional ratio among one yellow pixel, one magenta pixel, one cyan pixel, and one black pixel in the secondary scanning direction.

In the image printing method, the dimensional ratio among one yellow pixel, one magenta pixel, one cyan pixel, and one black pixel in the secondary scanning direction is preferably set to one selected from the group comprising, in no particular order, (10:12:15:20), (8:10:12:15), (15:20:24:30), (21:24:28:42), (30:35:42), (10:12:15), (8:9:12), (2:3:4), (5:6:10), (5:8:10), (7:8:14), and (3:4:6).

Furthermore, the present invention also provides an image printing method, wherein one pixel is formed from a plurality of dots arranged in the primary scanning direction, in which printing elements are arranged, and in the secondary scanning direction perpendicular to the primary scanning direction; wherein the tone of one pixel is expressed by changing the overall printing area in accordance with whether or not the dots are printed; and wherein a multicolor image is printed by combination of one yellow pixel, one magenta pixel, one cyan pixel, and one black pixel, the method comprising the step of: setting to a nonintegral multiple a dimensional ratio among one yellow pixel, one magenta pixel, one cyan pixel, and one black pixel in the primary scanning direction.

In the image printing method, the dimensional ratio among one yellow pixel, one magenta pixel, one cyan pixel, and one black pixel in the primary scanning direction is preferably set to one selected from the group comprising, in no particular order, (10:15:20).

According to the foregoing image printing method, since the size ratio among the single color pixels in the secondary scanning direction is set to a nonintegral multiple, the pixel pitch of each color is changed, thus preventing chromatic misregistration in the same manner as in the case of a VR screen method, which prevents chromatic misregistration by changing dot pitch. Further, it is also possible to set the size ratio among the single color pixels in the primary scanning direction to a nonintegral multiple. Even in such a case, chromatic misregistration can be prevented in the manner analogous to that described previously.

The dimension or size of one pixel in the primary or secondary scanning direction used herein signifies the length of a unit matrix in the primary or secondary scanning direction.

Further, a nonintegral multiple used herein signifies that the dimensional ratio of an arbitrary color pixel to at least one another color pixel in the secondary scanning direction is a nonintegral multiple. In short, in the case of a dimensional ratio among single color pixels being (10:12:15:20), if 10 is selected as the size of an arbitrary color pixel, a ratio of 12 to 10 can be represented as a nonintegral multiple of 1.2. In the case of a ratio of 15 to 10, there is obtained a nonintegral multiple of 15. However, in the case of a ratio of 20 to 10, there is obtained an integral multiple of 2. Of the three ratios, two represent nonintegral multiples. Further, even when 12 is selected as the size of an arbitrary color pixel, all the three ratios represent nonintegral multiples. Still further, even when 15 is selected as the size of an arbitrary color pixel, all the three ratios represent nonintegral multiples. Yet further, when 20 is selected as the size of an arbitrary color pixel, two of the three ratios represent nonintegral multiples. Accordingly, in the case of the foregoing example, since at least a dimensional ratio of an arbitrary color pixel to at least one another color pixel in the secondary scanning direction represents a nonintegral multiple, the dimensional ratio (10:12:15:20) can be said to be a ratio of nonintegral multiple.

DETAILED DESCRIPTION OF PREFERRED EMBODIMENTS

An image printing method according to the best mode for carrying out the present invention will be described in detail hereinbelow by reference to the accompanying drawings.

Figure 1:
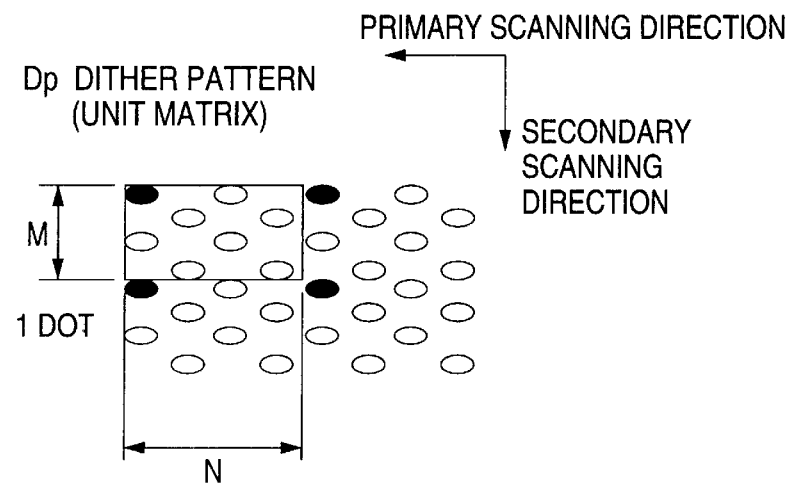
FIG. 1 is a schematic representation for explaining an image printing method according to a first embodiment of the present invention, showing an array of dots and a dither pattern.

FIG. 1 is a schematic representation for explaining the image printing method according to the present invention, showing an array of dots and a dither pattern. A plurality of printing elements (e.g., heating elements) are placed in a line on the head of an unillustrated thermal printer at given intervals. The reverse side of an ink ribbon is heated by the heating elements, and the thus-fused ink is transferred onto printing paper.

In response to the width of a pulse signal output from an unillustrated pulse generation section, the even-numbered and odd-numbered heating elements are alternately heated every line, so that every other dot is printed or dots are printed in a staggered pattern.

The printing paper and the ink ribbon are moved in the secondary scanning direction while they are brought into close contact with each other by means of a platen. The printing paper is moved back and forth the same number of times as the number of color ink ribbons (three or four), and color images, e.g., (a black image), a cyan image, a magenta image, and a yellow image are sequentially transferred to the printing paper.

A dot 1 is printed while its dot pitch in the secondary scanning direction is changed for each color by means of the VR screen method, which is a technique for preventing chromatic misregistration. More specifically, for each color, a dot pattern having desired resolution in the secondary scanning direction is created by changing dot pitch in the secondary scanning direction at a desired magnification. A multicolor image is created by superimposing the thus-created different color dot patterns one over another. As a result, chromatic misregistration is prevented from arising in one particular direction, thus preventing chromatic moire.

In other words, a dot is a minimum control unit of the recording elements which records an image to a recording media. By contrast, a pixel is a minimum unit to express a tone.

An M×N array of dots serves as one block (or a unit matrix), forming a dither pattern Dp. The dither pattern Dp corresponds to one pixel. Tone is expressed by means of a total area of transferred dots, by means of controlling the number of dots transferred into the block. Accordingly, in a case where a dither pattern Dp is utilized, resolution based on a dot basis corresponds to resolution based on a dither pattern (Dp) basis.

The image printing method according to the present embodiment involves printing an image through the record controlling operations mentioned previously. Under this method, a color dither pattern Dp is created in such a way that the dimension of a pattern (or the size of one block comprising an M×N array of dots) of each color has a unique given correlation. In short, the dither patterns are created in such a way that a dimensional ratio among the color dither patterns in the secondary scanning direction becomes a nonintegral multiple.

The VR screen method prevents chromatic misregistration by changing dot pitch in the secondary direction for each color. If the dither patterns are utilized together with the VR screen method, actual dot pitch is determined without reference to resolution. As a result, the different color dither patterns: that is, pixels, match one another. Accordingly, the VR screen method encounters difficulty in sufficiently preventing chromatic misregistration by changing dot pitch in the secondary scanning direction.

In contrast, if the dither patterns Dp are created in such a way that the dimensions of color dither patterns each have unique given correlations, the pixel pitch of each color dither pattern is changed, thus preventing chromatic misregistration in the same manner as in the case of the VR screen method, which prevents chromatic misregistration by changing dot pitch.

As mentioned previously, under the image printing method according to the present embodiment, color dither patterns Dp are created in such a way that the dimensions of each color dither pattern have a unique given correlation. As a result, even in a case where the dither patterns are used together with the VR screen method, chromatic misregistration can be prevented by changing pixel pitch for each color.

The color dither patterns Dp may also be formed in such a way that the dimensions of each color dither pattern have a unique given correlation in the primary scanning direction. Even in this case, the method yields the same advantageous result as that yielded previously.

Next, the results of tests produced by the image printing method according to the present invention and those produced by the conventional image printing method are compared with one another with regard to chromatic moire and misregistration.

Figure 2:
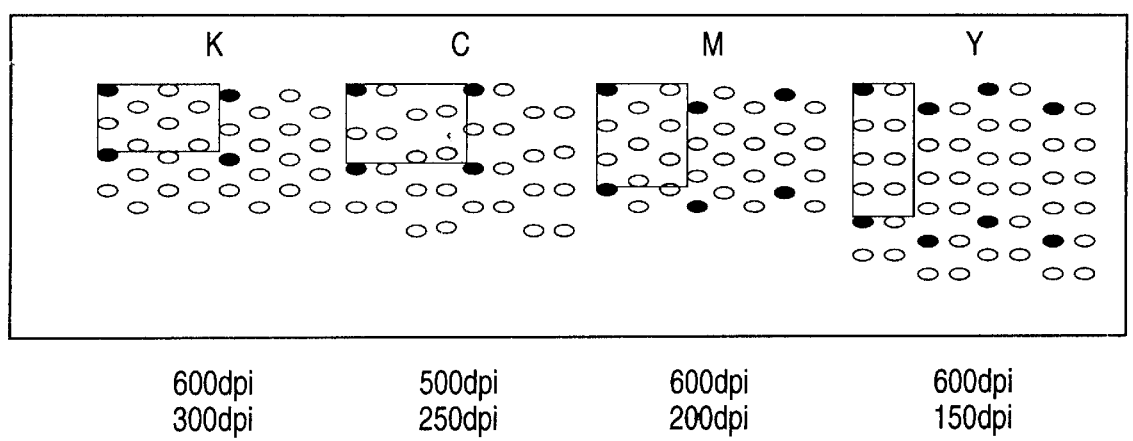
FIG. 2 is a schematic representation showing a dot pattern and a dither pattern printed for each color by the image printing method according to the first embodiment of the present invention.
Figure 3:
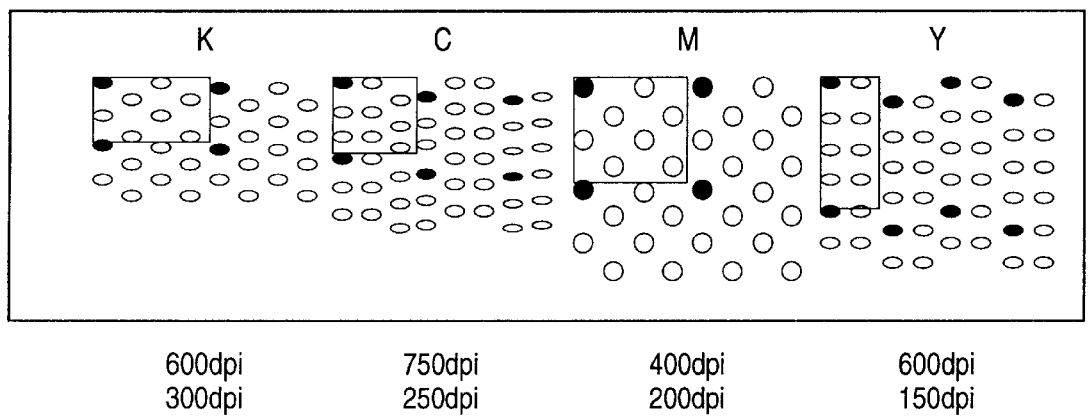
FIG. 3 is a schematic representation showing a dot pattern and a dither pattern printed for each color by an image printing method according to a second embodiment of the present invention.
Figure 4:
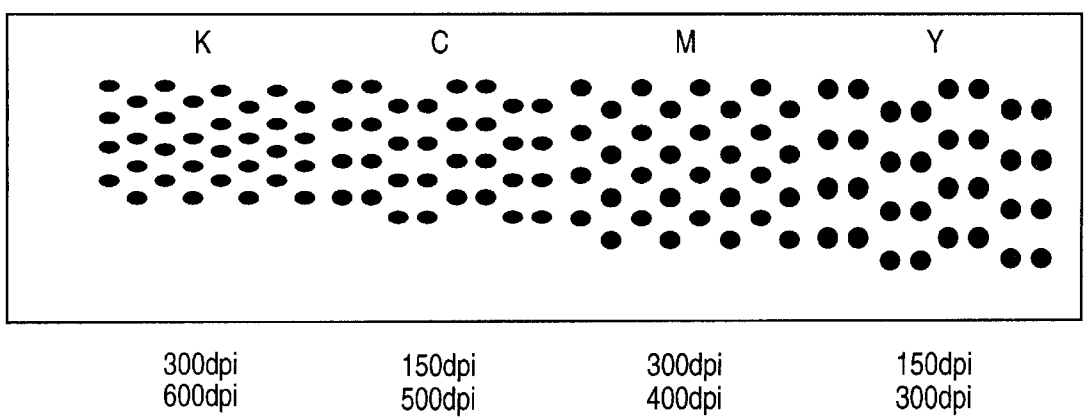
FIG. 4 is a schematic representation showing a dot pattern printed for each color by a conventional image printing method.

Conditions used for implementing the methods are as follows:

a) Printing Head
  Element Pitch: 600 dpi
  Element Size: 35 μm wide in the primary scanning direction
    40 μm wide in the secondary scanning direction
  Number of Elements: 7,296
  Resistance: an average of 8,000Ω
b) Printing Material
  Ribbon: Digital Color Proof—Proof Ribbon J for First Proof (manufactured by Fuji Photo Film Co., Ltd.)
  Receiver: Digital Color Proof—Receiver Sheet J for First Proof (manufactured by Fuji Photo Film Co., Ltd.)

c) Printing Conditions
   Line Speed: 7 msec/line (on the basis of 300 dpi resolution)
   Strobe: 2 ms FIG. 2 is a schematic representation showing a dot pattern and a dither pattern printed for each color by the method according to a first embodiment of the present invention. FIG. 3 is a schematic representation showing a dot pattern and a dither pattern printed for each color by the method according to a second embodiment of the present invention. FIG. 4 is a schematic representation showing a dot pattern and a dither pattern printed for each color by an existing image printing method.

In FIGS. 2 and 3, numerical values in an upper row represent resolutions corresponding to dot pitches in the secondary scanning direction when no dither pattern is utilized. In contrast, numerical values in a lower row represent resolutions corresponding to dot pitches in the secondary scanning direction when dither patterns are utilized. In FIG. 4, numerical values provided below the dot patterns represent resolutions corresponding to dot pitches in the primary and secondary directions when no dither patterns are utilized.

In FIGS. 2 through 4, dots are shown for each color for the sake of explanation. In effect, color dots are printed in the same printing area in a superimposed manner when they are actually printed.

Resolutions corresponding to dot pitches in the secondary scanning direction according to the first embodiment are 600 dpi, 500 dpi, 600 dpi, and 600 dpi respectively for K, C, M, and Y. As a result of the dither pattern Dp being formed in such a way that the dimensions of each color dither pattern has a unique given correlation (see Table 1, which will be described later), the resolutions corresponding to the lengths of the unit which will be described later), the resolutions corresponding to the lengths of the unit matrices in the secondary scanning direction become 300 dpi, 250 dpi, 200 dpi, and 150 dpi.

The resolutions corresponding to dot pitches in the secondary scanning direction according to the second embodiment are 600 dpi, 750 dpi, 400 dpi, and 600 dpi in order of K, C, M, and Y.

As a result of the dither pattern Dp being formed in such a way that the dimensions of each color dither pattern have a unique given correlation (see Table 1, which will be described later), the resolutions corresponding to the lengths of the unit matrices in the secondary scanning direction become 300 dpi, 250 dpi, 200 dpi, and 150 dpi. Table 1 shows the correlation among the dimensions of the color dither patterns Dp and visual evaluation of chromatic misregistration or moire of the patterns.

Dimensional Ratio among Color Dither Unit Matrices

|  |  | K | C | M | Y | Chromatic Misregistration | Chromatic Moire |
|---|---|---|---|---|---|---|---|
| First Embodiment | Primary Scanning Direction | 20 | 20 | 15 | 10 | ○ | ○ |
|  | Secondary Scanning Direction | 10 | 12 | 15 | 20 |  |  |
| Second Embodiment | Primary Scanning Direction | 20 | 15 | 20 | 10 | ○ | ○ |
|  | Secondary Scanning Direction | 10 | 12 | 15 | 20 |  |  |
| Conventional Example |  | — | — | — | — | Δ | X |

Legend:
○ represents "available";
Δ represents "possibly available for some applications";
X represents "not available".

As is obvious from Table 1, according to the first embodiment, the dimensional ratio of the color dither patterns Dp in the secondary scanning direction is set to (10:12:15:20) in no particular order, and the dimensional ratio of the color dither patterns Dp in the primary scanning direction is set to (10:15:20) in no particular order. As a result, compared with color registration or chromatic moire of an image formed by the existing method, that of the image formed by the image forming method according to the present invention is diminished to a practicable extent.

According to the second embodiment, the dimensional ratio of the color dither patterns Dp in the secondary scanning direction is set to (10:12:15:20) in no particular order, and the dimensional ratio of the color dither patterns Dp in the primary scanning direction is set to (10:15:20) in no particular order according to the first embodiment. As a result, compared with color registration or chromatic moire of an image formed by the existing method, that of the image formed by the image forming method according to the present invention is diminished to a practicable extent.

The ratios mentioned for the embodiments are the optimum ratios in light of the feasibility and performance of a system. However, in some cases, the ratios provided in Tables 2 through 4 or Tables 5 through 10 may alternatively be used. In the tables, 1, 2, 3, and 4 or 1, 2, 3 are assigned to K, C, M, and Y in no particular order. Reference symbol A designates a ratio of the minimum pitch of pitches provided for 1 through 4 to the least common denominator of the pitches provided for 1 through 4. The smaller the value of A, the less moire noticeable. Reference symbol B designates a ratio of the minimum pitch to the maximum pitch of the pitches provided for 1 through 4. The smaller the value of B, the more easy a system becomes feasible. The reason for this is that it becomes difficult to control energy if the dimension of a dot becomes significantly differs from color to color.

TABLE 2

| 1 | 2 | 3 | 4 | A | B |
|---|---|---|---|---|---|
| 24 | 20 | 16 | 15 | 16 | 1.6 |
| 20 | 18 | 15 | 12 | 15 | 1.7 |
| 15 | 12 | 10 | 9 | 20 | 1.7 |
| 20 | 16 | 15 | 12 | 20 | 1.7 |
| 35 | 30 | 28 | 21 | 20 | 1.7 |
| 18 | 15 | 12 | 10 | 18 | 1.8 |
| 15 | 12 | 10 | 8 | 15 | 1.9 |
| 20 | 15 | 12 | 10 | 6 | 2 |
| 30 | 24 | 20 | 15 | 8 | 2 |
| 42 | 28 | 24 | 21 | 8 | 2 |
| 70 | 56 | 40 | 35 | 8 | 2 |
| 18 | 15 | 10 | 9 | 10 | 2 |

TABLE 2-continued

| 1 | 2 | 3 | 4 | A | B |
|---|---|---|---|---|---|
| 24 | 20 | 15 | 12 | 10 | 2 |
| 12 | 9 | 8 | 6 | 12 | 2 |
| 30 | 20 | 18 | 15 | 12 | 2 |
| 28 | 24 | 21 | 14 | 12 | 2 |
| 24 | 21 | 14 | 12 | 14 | 2 |
| 36 | 28 | 21 | 18 | 14 | 2 |
| 40 | 35 | 28 | 20 | 14 | 2 |
| 18 | 16 | 12 | 9 | 16 | 2 |
| 30 | 20 | 16 | 15 | 16 | 2 |
| 30 | 24 | 16 | 15 | 16 | 2 |
| 10 | 9 | 6 | 5 | 18 | 2 |
| 16 | 12 | 9 | 8 | 18 | 2 |
| 20 | 18 | 15 | 10 | 18 | 2 |
| 28 | 21 | 18 | 14 | 18 | 2 |
| 6 | 5 | 4 | 3 | 20 | 2 |
| 18 | 12 | 10 | 9 | 20 | 2 |
| 24 | 16 | 15 | 12 | 20 | 2 |
| 30 | 21 | 15 | 14 | 15 | 2.1 |
| 20 | 12 | 10 | 9 | 20 | 2.2 |
| 20 | 15 | 10 | 9 | 20 | 2.2 |
| 20 | 18 | 10 | 9 | 20 | 2.2 |
| 20 | 15 | 12 | 9 | 20 | 2.2 |
| 20 | 18 | 12 | 9 | 20 | 2.2 |
| 20 | 18 | 15 | 9 | 20 | 2.2 |

TABLE 3

| 1 | 2 | 3 | 4 | A | B |
|---|---|---|---|---|---|
| 28 | 21 | 14 | 12 | 7 | 2.3 |
| 28 | 21 | 14 | 12 | 7 | 2.3 |
| 70 | 42 | 35 | 30 | 7 | 2.3 |
| 18 | 12 | 9 | 8 | 9 | 2.3 |
| 14 | 12 | 7 | 6 | 14 | 2.3 |
| 21 | 18 | 14 | 9 | 14 | 2.3 |
| 28 | 24 | 21 | 12 | 14 | 2.3 |
| 35 | 30 | 21 | 15 | 14 | 2.3 |
| 16 | 14 | 8 | 7 | 16 | 2.3 |
| 9 | 8 | 6 | 4 | 18 | 2.3 |
| 18 | 16 | 9 | 8 | 18 | 2.3 |
| 12 | 10 | 6 | 5 | 12 | 2.4 |
| 24 | 15 | 12 | 10 | 12 | 2.4 |
| 24 | 20 | 15 | 10 | 12 | 2.4 |
| 36 | 20 | 18 | 15 | 12 | 2.4 |
| 36 | 30 | 20 | 15 | 12 | 2.4 |
| 30 | 20 | 15 | 12 | 5 | 2.5 |
| 10 | 8 | 5 | 4 | 10 | 2.5 |
| 15 | 12 | 10 | 6 | 10 | 2.5 |
| 35 | 28 | 20 | 14 | 10 | 2.5 |
| 10 | 6 | 5 | 4 | 15 | 2.5 |
| 15 | 10 | 9 | 6 | 15 | 2.5 |
| 20 | 15 | 10 | 8 | 15 | 2.5 |
| 20 | 15 | 12 | 8 | 15 | 2.5 |
| 35 | 21 | 15 | 14 | 15 | 2.5 |
| 35 | 30 | 15 | 14 | 15 | 2.5 |
| 35 | 30 | 21 | 14 | 15 | 2.5 |
| 15 | 10 | 8 | 6 | 20 | 2.5 |
| 15 | 12 | 8 | 6 | 20 | 2.5 |
| 30 | 16 | 15 | 12 | 20 | 2.5 |
| 18 | 14 | 9 | 7 | 18 | 2.6 |
| 36 | 21 | 18 | 14 | 18 | 2.6 |
| 36 | 28 | 21 | 14 | 18 | 2.6 |
| 8 | 6 | 4 | 3 | 8 | 2.7 |
| 40 | 24 | 20 | 15 | 8 | 2.7 |
| 40 | 30 | 24 | 15 | 8 | 2.7 |
| 56 | 28 | 24 | 21 | 8 | 2.7 |
| 56 | 42 | 24 | 21 | 8 | 2.7 |
| 24 | 16 | 12 | 9 | 16 | 2.7 |
| 24 | 18 | 16 | 9 | 16 | 2.7 |
| 40 | 20 | 16 | 15 | 16 | 2.7 |
| 40 | 24 | 16 | 15 | 16 | 2.7 |
| 40 | 30 | 16 | 15 | 16 | 2.7 |

TABLE 4

| 1 | 2 | 3 | 4 | A | B |
|---|---|---|---|---|---|
| 14 | 10 | 7 | 5 | 14 | 2.8 |
| 20 | 14 | 10 | 7 | 20 | 2.9 |
| 40 | 35 | 20 | 14 | 20 | 2.9 |
| 40 | 35 | 28 | 14 | 20 | 2.9 |
| 6 | 4 | 3 | 2 | 6 | 3 |
| 15 | 10 | 6 | 5 | 6 | 3 |
| 30 | 15 | 12 | 10 | 6 | 3 |
| 12 | 9 | 6 | 4 | 9 | 3 |
| 24 | 12 | 9 | 8 | 9 | 3 |
| 24 | 18 | 9 | 8 | 9 | 3 |
| 30 | 18 | 15 | 10 | 9 | 3 |
| 9 | 6 | 4 | 3 | 12 | 3 |
| 15 | 12 | 6 | 5 | 12 | 3 |
| 18 | 9 | 8 | 6 | 12 | 3 |
| 15 | 12 | 10 | 5 | 12 | 3 |
| 21 | 14 | 12 | 7 | 12 | 3 |
| 33 | 22 | 12 | 11 | 12 | 3 |
| 30 | 24 | 15 | 10 | 12 | 3 |
| 6 | 5 | 3 | 2 | 15 | 3 |
| 12 | 6 | 5 | 4 | 15 | 3 |
| 12 | 10 | 5 | 4 | 15 | 3 |
| 18 | 10 | 9 | 6 | 15 | 3 |
| 18 | 15 | 10 | 6 | 15 | 3 |
| 24 | 15 | 10 | 8 | 15 | 3 |
| 24 | 15 | 12 | 8 | 15 | 3 |
| 24 | 20 | 15 | 8 | 15 | 3 |
| 36 | 20 | 15 | 12 | 15 | 3 |
| 15 | 9 | 6 | 5 | 18 | 3 |
| 12 | 9 | 8 | 4 | 18 | 3 |
| 15 | 10 | 9 | 5 | 18 | 3 |
| 21 | 14 | 9 | 7 | 18 | 3 |
| 21 | 18 | 9 | 7 | 18 | 3 |
| 24 | 16 | 9 | 8 | 18 | 3 |
| 21 | 18 | 14 | 7 | 18 | 3 |
| 33 | 22 | 18 | 11 | 18 | 3 |
| 39 | 26 | 18 | 13 | 18 | 3 |

TABLE 5

| 1 | 2 | 3 | A | B |
|---|---|---|---|---|
| 48 | 45 | 40 | 18 | 1.2 |
| 28 | 24 | 21 | 8 | 1.3 |
| 45 | 40 | 36 | 10 | 1.3 |
| 20 | 18 | 15 | 12 | 1.3 |
| 44 | 36 | 33 | 12 | 1.3 |
| 35 | 30 | 28 | 15 | 1.3 |
| 20 | 16 | 15 | 16 | 1.3 |
| 52 | 48 | 39 | 16 | 1.3 |
| 45 | 42 | 35 | 18 | 1.3 |
| 12 | 10 | 9 | 20 | 1.3 |
| 16 | 15 | 12 | 20 | 1.3 |
| 42 | 35 | 30 | 7 | 1.4 |
| 40 | 35 | 28 | 10 | 1.4 |
| 55 | 44 | 40 | 11 | 1.4 |
| 52 | 39 | 36 | 13 | 1.4 |
| 60 | 55 | 44 | 15 | 1.4 |
| 30 | 28 | 21 | 20 | 1.4 |
| 15 | 12 | 10 | 6 | 1.5 |
| 12 | 9 | 8 | 9 | 1.5 |
| 21 | 18 | 14 | 9 | 1.5 |
| 9 | 8 | 6 | 12 | 1.5 |
| 33 | 24 | 22 | 12 | 1.5 |
| 6 | 5 | 4 | 15 | 1.5 |
| 21 | 15 | 14 | 15 | 1.5 |
| 33 | 30 | 22 | 15 | 1.5 |
| 39 | 30 | 26 | 15 | 1.5 |
| 48 | 44 | 33 | 16 | 1.5 |
| 39 | 36 | 26 | 18 | 1.5 |
| 51 | 36 | 34 | 18 | 1.5 |
| 60 | 52 | 39 | 20 | 1.5 |

TABLE 6

| 1 | 2 | 3 | A | B |
|---|---|---|---|---|
| 24 | 20 | 15 | 8 | 1.6 |
| 56 | 40 | 35 | 8 | 1.6 |
| 39 | 26 | 24 | 13 | 1.6 |
| 28 | 21 | 18 | 14 | 1.6 |
| 24 | 16 | 15 | 16 | 1.6 |
| 36 | 33 | 22 | 18 | 1.6 |
| 57 | 38 | 36 | 19 | 1.6 |
| 20 | 15 | 12 | 5 | 1.7 |
| 15 | 10 | 9 | 10 | 1.7 |
| 35 | 30 | 21 | 10 | 1.7 |
| 24 | 21 | 14 | 12 | 1.7 |
| 36 | 28 | 21 | 12 | 1.7 |
| 60 | 42 | 35 | 12 | 1.7 |
| 10 | 9 | 6 | 15 | 1.7 |
| 55 | 45 | 33 | 15 | 1.7 |
| 51 | 34 | 30 | 17 | 1.7 |
| 5 | 4 | 3 | 20 | 1.7 |
| 21 | 14 | 12 | 7 | 1.8 |
| 35 | 28 | 20 | 7 | 1.8 |
| 18 | 15 | 10 | 9 | 1.8 |
| 63 | 45 | 35 | 9 | 1.8 |
| 33 | 22 | 18 | 11 | 1.8 |
| 44 | 33 | 24 | 11 | 1.8 |
| 55 | 33 | 30 | 11 | 1.8 |
| 63 | 56 | 36 | 14 | 1.8 |
| 16 | 12 | 9 | 16 | 1.8 |
| 9 | 6 | 5 | 18 | 1.8 |
| 60 | 44 | 33 | 20 | 1.8 |
| 60 | 55 | 33 | 20 | 1.8 |
| 15 | 10 | 8 | 15 | 1.9 |
| 15 | 12 | 8 | 15 | 1.9 |
| 45 | 40 | 24 | 15 | 1.9 |
| 57 | 38 | 30 | 19 | 1.9 |

TABLE 7

| 1 | 2 | 3 | A | B |
|---|---|---|---|---|
| 6 | 4 | 3 | 4 | 2 |
| 4 | 3 | 2 | 6 | 2 |
| 10 | 6 | 5 | 6 | 2 |
| 10 | 8 | 5 | 8 | 2 |
| 14 | 8 | 7 | 8 | 2 |
| 6 | 5 | 3 | 10 | 2 |
| 8 | 5 | 4 | 10 | 2 |
| 14 | 10 | 7 | 10 | 2 |
| 18 | 10 | 9 | 10 | 2 |
| 14 | 12 | 7 | 12 | 2 |
| 22 | 12 | 11 | 12 | 2 |
| 8 | 7 | 4 | 14 | 2 |
| 10 | 7 | 5 | 14 | 2 |
| 12 | 7 | 6 | 14 | 2 |
| 18 | 14 | 9 | 14 | 2 |
| 22 | 14 | 11 | 14 | 2 |
| 26 | 14 | 13 | 14 | 2 |
| 18 | 16 | 9 | 16 | 2 |
| 22 | 16 | 11 | 16 | 2 |
| 26 | 16 | 13 | 16 | 2 |
| 30 | 16 | 15 | 16 | 2 |
| 10 | 9 | 5 | 18 | 2 |
| 14 | 9 | 7 | 18 | 2 |
| 16 | 9 | 8 | 18 | 2 |
| 22 | 18 | 11 | 18 | 2 |
| 26 | 18 | 13 | 18 | 2 |
| 34 | 18 | 17 | 18 | 2 |
| 22 | 20 | 11 | 20 | 2 |
| 26 | 20 | 13 | 20 | 2 |
| 34 | 20 | 17 | 20 | 2 |
| 38 | 20 | 19 | 20 | 2 |

TABLE 8

| 1 | 2 | 3 | A | B |
|---|---|---|---|---|
| 30 | 15 | 14 | 15 | 2.1 |
| 30 | 21 | 14 | 15 | 2.1 |
| 45 | 35 | 21 | 15 | 2.1 |
| 60 | 35 | 28 | 15 | 2.1 |
| 34 | 17 | 16 | 17 | 2.1 |
| 51 | 34 | 24 | 17 | 2.1 |
| 38 | 19 | 18 | 19 | 2.1 |
| 22 | 11 | 10 | 11 | 2.2 |
| 26 | 13 | 12 | 13 | 2.2 |
| 39 | 26 | 18 | 13 | 2.2 |
| 52 | 39 | 24 | 13 | 2.2 |
| 20 | 10 | 9 | 20 | 2.2 |
| 20 | 12 | 9 | 20 | 2.2 |
| 20 | 15 | 9 | 20 | 2.2 |
| 20 | 18 | 9 | 20 | 2.2 |
| 14 | 7 | 6 | 7 | 2.3 |
| 28 | 21 | 12 | 7 | 2.3 |
| 35 | 21 | 15 | 7 | 2.3 |
| 9 | 6 | 4 | 9 | 2.3 |
| 18 | 9 | 8 | 9 | 2.3 |
| 45 | 36 | 20 | 9 | 2.3 |
| 63 | 36 | 28 | 9 | 2.3 |
| 7 | 6 | 3 | 14 | 2.3 |
| 21 | 14 | 9 | 14 | 2.3 |
| 16 | 8 | 7 | 16 | 2.3 |
| 16 | 14 | 7 | 16 | 2.3 |
| 48 | 28 | 21 | 16 | 2.3 |
| 9 | 8 | 4 | 18 | 2.3 |
| 45 | 24 | 20 | 18 | 2.3 |
| 12 | 6 | 5 | 12 | 2.4 |
| 12 | 10 | 5 | 12 | 2.4 |
| 24 | 15 | 10 | 12 | 2.4 |

TABLE 9

| 1 | 2 | 3 | A | B |
|---|---|---|---|---|
| 36 | 20 | 15 | 12 | 2.4 |
| 34 | 17 | 14 | 17 | 2.4 |
| 38 | 19 | 16 | 19 | 2.4 |
| 57 | 38 | 24 | 19 | 2.4 |
| 10 | 5 | 4 | 5 | 2.5 |
| 15 | 10 | 6 | 5 | 2.5 |
| 5 | 4 | 2 | 10 | 2.5 |
| 35 | 20 | 14 | 10 | 2.5 |
| 45 | 20 | 18 | 10 | 2.5 |
| 5 | 3 | 2 | 15 | 2.5 |
| 20 | 15 | 8 | 15 | 2.5 |
| 35 | 15 | 14 | 15 | 2.5 |
| 35 | 30 | 14 | 15 | 2.5 |
| 55 | 30 | 22 | 15 | 2.5 |
| 15 | 8 | 6 | 20 | 2.5 |
| 45 | 40 | 18 | 20 | 2.5 |
| 55 | 40 | 22 | 20 | 2.5 |
| 26 | 13 | 10 | 13 | 2.6 |
| 18 | 9 | 7 | 18 | 2.6 |
| 18 | 14 | 7 | 18 | 2.6 |
| 36 | 21 | 14 | 18 | 2.6 |
| 8 | 4 | 3 | 8 | 2.7 |
| 8 | 6 | 3 | 8 | 2.7 |
| 40 | 24 | 15 | 8 | 2.7 |
| 56 | 24 | 21 | 8 | 2.7 |
| 24 | 16 | 9 | 16 | 2.7 |
| 40 | 16 | 15 | 16 | 2.7 |
| 56 | 48 | 21 | 16 | 2.7 |
| 38 | 19 | 14 | 19 | 2.7 |
| 22 | 11 | 8 | 11 | 2.8 |
| 33 | 22 | 12 | 11 | 2.3 |
| 55 | 22 | 20 | 11 | 2.8 |
| 55 | 44 | 20 | 11 | 2.8 |
| 14 | 7 | 5 | 14 | 2.8 |
| 14 | 10 | 5 | 14 | 2.8 |
| 42 | 35 | 15 | 14 | 2.8 |
| 56 | 35 | 20 | 14 | 2.8 |

TABLE 9-continued

| 1  | 2  | 3  | A  | B   |
|----|----|----|----|-----|
| 34 | 17 | 12 | 17 | 2.8 |
| 51 | 34 | 18 | 17 | 2.8 |

TABLE 10

| 1  | 2  | 3  | A  | B   |
|----|----|----|----|-----|
| 20 | 10 | 7  | 20 | 2.9 |
| 20 | 14 | 7  | 20 | 2.9 |
| 40 | 35 | 14 | 20 | 2.9 |
| 60 | 28 | 21 | 20 | 2.9 |
| 60 | 35 | 21 | 20 | 2.9 |
| 6  | 3  | 2  | 3  | 3   |
| 15 | 6  | 5  | 6  | 3   |
| 12 | 9  | 4  | 9  | 3   |
| 15 | 9  | 5  | 9  | 3   |
| 21 | 9  | 7  | 9  | 3   |
| 24 | 9  | 8  | 9  | 3   |
| 9  | 4  | 3  | 12 | 3   |
| 15 | 12 | 5  | 12 | 3   |
| 21 | 12 | 7  | 12 | 3   |
| 33 | 12 | 11 | 12 | 3   |
| 6  | 5  | 2  | 15 | 3   |
| 9  | 5  | 3  | 15 | 3   |
| 12 | 5  | 4  | 15 | 3   |
| 21 | 15 | 7  | 15 | 3   |
| 24 | 15 | 8  | 15 | 3   |
| 33 | 15 | 11 | 15 | 3   |
| 39 | 15 | 13 | 15 | 3   |
| 42 | 15 | 14 | 15 | 3   |
| 21 | 18 | 7  | 18 | 3   |
| 33 | 18 | 11 | 18 | 3   |
| 39 | 18 | 13 | 18 | 3   |
| 51 | 18 | 17 | 18 | 3   |

As has been described in detail, under an image printing method according to the present invention, in a case where dither patterns are used together with a VR screen method, color dither patterns Dp, which serve as unit matrices, are formed in such a way that the dimensional ratio among the color dither patterns in the secondary scanning direction becomes a nonintegral multiple, thus rendering the color dither patterns different in pixel pitch from one another beforehand. Accordingly, color pixels are prevented from match or deviate from one another in unison, preventing chromatic misregistration. The color dither patterns may alternatively be formed in such a way that the dimensional ratio among the color dither patterns in the primary scanning direction becomes a nonintegral multiple. Even in such a case, chromatic misregistration can be prevented in the same manner as that described previously.

The foregoing methods can be not only limited to a thermal head but also an ink-jet head, a laser printing head, an LED head, an EL head, a CRT head, or the like. Even in such a case, an advantageous result analogous to that described previously can be expected.

What is claimed is:

1. An image printing method, wherein a multicolor image is printed by combination of one yellow pixel, one magenta pixel, one cyan pixel, and one black pixel, the method comprising the steps of:

defining one pixel, representing a dot size of one color, as a plurality of dots arranged in a primary scanning direction, in which printing elements are arranged, and in a secondary scanning direction perpendicular to the primary scanning direction, and changing a tone of said one pixel by controlling a printing area in said one pixel in accordance with at least whether or not said plurality of dots are printed, further wherein a length of said one pixel in the secondary scanning direction, being represented by said plurality of dots in the secondary scanning direction, is set to a non-integer multiple so as to be different from a length of one pixel of another color in the secondary scanning direction.

2. The image forming method according to claim 1, wherein the non-integer multiple pixel length among one yellow pixel, one magenta pixel, one cyan pixel, and one black pixel in the secondary scanning direction is set to one selected from the group comprising, in no particular order, (10:12:15:20), (8:10:12:15), (15:20:24:30), (21:24:28:42), (30:35:42), (10:12:15), (8:9:12), (2:3:4), (5:6:10), (5:8:10), (7:8:14) and (3:4:6).

3. The image printed method according to claim 1, wherein the non-integer multiple of length in the secondary scanning direction is a non-integer multiple of at least two other lengths of pixels of two other colors in the secondary scanning direction.

4. An image forming method, wherein a multicolor image is printed by combination of one yellow pixel, one magenta pixel, one cyan pixel, and one black pixel, the method comprising the steps of:

defining one pixel, representing a dot size of one color, as a plurality of dots arranged in a primary scanning direction, in which printing elements are arranged, and in a secondary scanning direction perpendicular to the primary scanning direction, and changing a tone of said one pixel by controlling a printing area in said one pixel in accordance with at least whether or not said plurality of dots are printed, further wherein a length of said one pixel in the primary scanning direction, being represented by said plurality of dots in the primary scanning direction, is set to a non-integer multiple so as to be different from a length of one pixel of another color in the primary scanning direction.

5. The image forming method according to claim 4, wherein non-integer multiple pixel length among one yellow pixel, one magenta pixel, one cyan pixel, and one black pixel in the primary scanning direction is set to, in no particular order, (10:15:20).

6. The image forming method according to claim 5, wherein the non-integer multiple is varied by dot pitch.

7. the image forming method according to claim 5, wherein the non-integer multiple is varied by pixel pitch.

8. The image forming method according to claim 4, wherein non-integer multiple length is varied by dot pitch.

9. The image printing method according to claim 8, wherein the non-integer multiple length in the secondary scanning direction is a non-integer multiple of at least two other lengths of pixels of two other colors in the secondary scanning direction.

10. The image forming method according to claim 4, wherein the non-integer multiple is varied by pixel pitch.

11. The image forming method according to claim 10, wherein the non-integer multiple of pixel length in the secondary scanning direction is a non-integer multiple of at least two other pixel lengths of two other colors in the secondary scanning direction.

12. An image printing method, wherein a multicolor image is printed by a combination of one yellow pixel, one magenta pixel, one cyan pixel, and one black pixel, said method comprising:

defining one pixel, representing a dot size of one color, as a plurality of dots arranged in a primary scanning direction, in which printing elements are arranged, and in a secondary scanning direction perpendicular to the primary scanning direction, and changing a tone of said one pixel by controlling a printing area in said one pixel in accordance with at least whether or not said plurality of dots are printed, and setting a length of respective pixels for each of said yellow pixel, magenta pixel, cyan pixel and black pixel in the secondary scanning direction wherein the respective length of each pixel in the secondary scanning direction is a non-integer multiple of at least one other pixel size in the secondary scanning direction, and wherein the non-integer multiple among one yellow pixel, one magenta pixel, one cyan pixel, and one black pixel in the secondary scanning direction is set, in no particular order, to one selected from the group consisting of (8:10:12:15), (15:20:12:15), (15:20:24:30), (21:24:28:42), (30:35:42), (10:12:15), (8:9:12), (2:3:4), (5:6:10), (5:8:10), (7:8:14) and (3:4:6).

13. The image printing method of claim 12, wherein the respective length of each pixel in the secondary scanning direction is a non-integer multiple of at least two other pixel lengths of two other colors in the secondary scanning direction.

14. An image forming method, wherein a multicolor image is printed by a combination of one yellow pixel, one magenta pixel, on cyan pixel, and one black pixel, the method comprising:

defining one pixel, representing a dot size of one color, as a plurality of dots arranged in a primary scanning direction, in which printing elements are arranged, and in a secondary scanning direction perpendicular to the primary scanning direction, and changing a tone of said one pixel by controlling a printing area in said one pixel in accordance with at least whether or not said plurality of dots are printed, and setting a length of respective pixels for each of said yellow pixel, magenta pixel, cyan pixel and black pixel in the primary scanning direction wherein the respective length of each pixel in the primary scanning direction is a non-integer multiple of at least one other pixel length of another color pixel in the primary scanning direction.

15. The image printing method of claim 14, wherein the respective length of each pixel in the primary scanning direction is a non-integer multiple of at least two other pixel lengths of two other colors in the primary scanning direction.

16. The image forming method according to claim 14, wherein the non-integer multiple among one yellow pixel, one magenta pixel, one cyan pixel, and one black pixel in the primary scanning direction is set, in no particular order, to (10:15:20).

* * * * *